(12) United States Patent
Nara et al.

(10) Patent No.: US 11,927,815 B2
(45) Date of Patent: Mar. 12, 2024

(54) OPTICAL RECEPTACLE, OPTICAL MODULE AND MANUFACTURING METHOD FOR OPTICAL RECEPTACLE

(71) Applicant: Enplas Corporation, Saitama (JP)

(72) Inventors: Honoka Nara, Saitama (JP); Ayano Hinata, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 17/817,423

(22) Filed: Aug. 4, 2022

(65) Prior Publication Data
US 2023/0038592 A1    Feb. 9, 2023

(30) Foreign Application Priority Data
Aug. 6, 2021 (JP) .................. 2021-129929

(51) Int. Cl.
*G02B 6/42* (2006.01)
*G02B 6/38* (2006.01)

(52) U.S. Cl.
CPC ......... *G02B 6/4243* (2013.01); *G02B 6/4255* (2013.01); *G02B 6/3831* (2013.01); *G02B 6/3865* (2013.01)

(58) Field of Classification Search
None
See application file for complete search history.

(56) References Cited

U.S. PATENT DOCUMENTS

| | | | |
|---|---|---|---|
| 7,348,540 B2 * | 3/2008 | Mogi | G02B 6/4204 250/239 |
| 9,291,783 B2 * | 3/2016 | Shibuya | H01L 31/02325 |
| 2004/0033033 A1 * | 2/2004 | Hoshino | G02B 6/4292 385/93 |
| 2006/0002667 A1 * | 1/2006 | Aronson | G02B 6/4206 385/94 |
| 2006/0093011 A1 | 5/2006 | Vancoille | |
| 2007/0131856 A1 * | 6/2007 | Mogi | G02B 6/4239 250/239 |
| 2014/0086536 A1 * | 3/2014 | Shibuya | H01L 27/14625 385/88 |

FOREIGN PATENT DOCUMENTS

JP    2006-163372 A    6/2006

* cited by examiner

*Primary Examiner* — Jerry Rahll
(74) *Attorney, Agent, or Firm* — Shih IP Law Group, PLLC

(57) ABSTRACT

An optical receptacle includes a first optical surface, a second optical surface, and an annular first cylindrical part disposed to surround a second central axis of the second optical surface. The first cylindrical part includes a first inner surface with a circular shape in a cross section perpendicular to the second central axis, and a second inner surface disposed on a second optical surface side than the first inner surface and provided with a circular shape in the cross section perpendicular to the second central axis. A diameter of the first inner surface is greater than a diameter of the second inner surface, and a length of the second inner surface in a direction along the second central axis is 0.5 to 4.0 mm.

6 Claims, 3 Drawing Sheets

OPTICAL RECEPTACLE, OPTICAL MODULE AND MANUFACTURING METHOD FOR OPTICAL RECEPTACLE

This application is entitled to the benefit of Japanese Patent Application No. 2021-129929, filed on Aug. 6, 2021, the disclosure of which including the specification, drawings and abstract is incorporated herein by reference in its entirety.

TECHNICAL FIELD

The present invention relates to an optical receptacle, an optical module and a manufacturing method for the optical receptacle.

BACKGROUND ART

In the related art, an optical module including a light-emitting element such as a surface-emitting laser (e.g., vertical cavity surface emitting laser (VCSEL)) and a light-receiving element such as a photodetector has been used for optical communications using an optical transmission member such as an optical fiber and an optical waveguide. The optical module includes one or more photoelectric conversion elements (light-emitting elements or light-receiving elements), and an optical receptacle for transmission, reception or transmission and reception.

PTL 1 discloses a resin lens structure (optical receptacle) including an objective surface (first optical surface) and an image surface (second optical surface). In the lens structure disclosed in PTL 1, a light source or a light detection device is fixed to the lens structure so as to face objective surface, and an optical fiber is inserted to a cylindrical part, and thus the optical fiber is fixed to the lens structure so as to face the image surface. The lens structure disclosed in PTL 1 guides, to the end surface of the optical fiber, light emitted from the light source, or guides, to the light detection device, light emitted from the optical fiber.

CITATION LIST

Patent Literature

PTL 1
Japanese Patent Application Laid-Open No. 2006-163372

SUMMARY OF INVENTION

Technical Problem

Here, in order to increase the light coupling rate between the light source or the light detection device and the optical fiber, it is necessary to highly accurately mold the cylindrical part for positioning the optical fiber. In general, in a lens structure as that disclosed in PTL 1, the interior of the cylindrical part is molded by using one long pin-shaped metal mold. At this time, with the pressure of the molten resin during the molding, the position of the pin-shaped metal mold may possibly be slightly shifted. In addition, such a lens structure is made of resin, and therefore may be distorted due to the shrinkage of the resin. In this manner, in the lens structure as that disclosed in PTL 1, a high molding accuracy is required for the entire cylindrical part that is long in the axial direction, but it is difficult to achieve the required accuracy for the reasons such as the positional displacement of the pin-shaped metal mold and the distortion of the mold.

An object of the present invention is to provide an optical receptacle with which an optical transmission member can be appropriately positioned even when it is molded by using a pin-shaped metal mold. In addition, another object of the present invention is to provide an optical module including the optical receptacle, and a manufacturing method for the optical receptacle.

Solution to Problem

An optical receptacle according to an embodiment of the present invention is integrally molded and configured to optically couple a photoelectric conversion element and an optical transmission member when the optical receptacle is disposed between a photoelectric conversion element package including the photoelectric conversion element and the optical transmission member, the optical receptacle including: a first optical surface configured to allow, to enter the optical receptacle, light emitted from the photoelectric conversion element package, or configured to emit, toward the photoelectric conversion element package, light travelled inside the optical receptacle; a second optical surface configured to emit, toward the optical transmission member, the light travelled inside the optical receptacle, or configured to allow, to enter the optical receptacle, light emitted from the optical transmission member; and a second cylindrical part disposed to surround a second central axis of the second optical surface at a position further from the first optical surface than the second optical surface. The second cylindrical part includes: a first inner surface with a circular shape in a cross section perpendicular to the second central axis, and a second inner surface disposed on a second optical surface side than the first inner surface and configured to hold the optical transmission member at a position facing the second optical surface, the second inner surface having a circular shape in the cross section perpendicular to the second central axis. A diameter of the first inner surface is greater than a diameter of the second inner surface, and a length of the second inner surface in a direction along the second central axis is 0.5 to 4.0 mm.

An optical module according to an embodiment of the present invention includes: a photoelectric conversion element package including a photoelectric conversion element; and the optical receptacle configured to optically couple the photoelectric conversion element and an optical transmission member.

A manufacturing method according to an embodiment of the present invention is a method for the optical receptacle, the manufacturing method including: forming an inner surface of the first cylindrical part by using a metal mold including a first molding surface with a shape complementary to the first inner surface and a second molding surface with a shape complementary to the second inner surface.

Advantageous Effects of Invention

According to the present invention, it is possible to provide an optical receptacle with which an optical transmission member can be appropriately positioned even when it is molded by using a pin-shaped metal mold. Therefore, according to the present invention, it is possible to provide an optical receptacle and an optical module that can appropriately perform optical communications.

DESCRIPTION OF EMBODIMENTS

Figure 1:
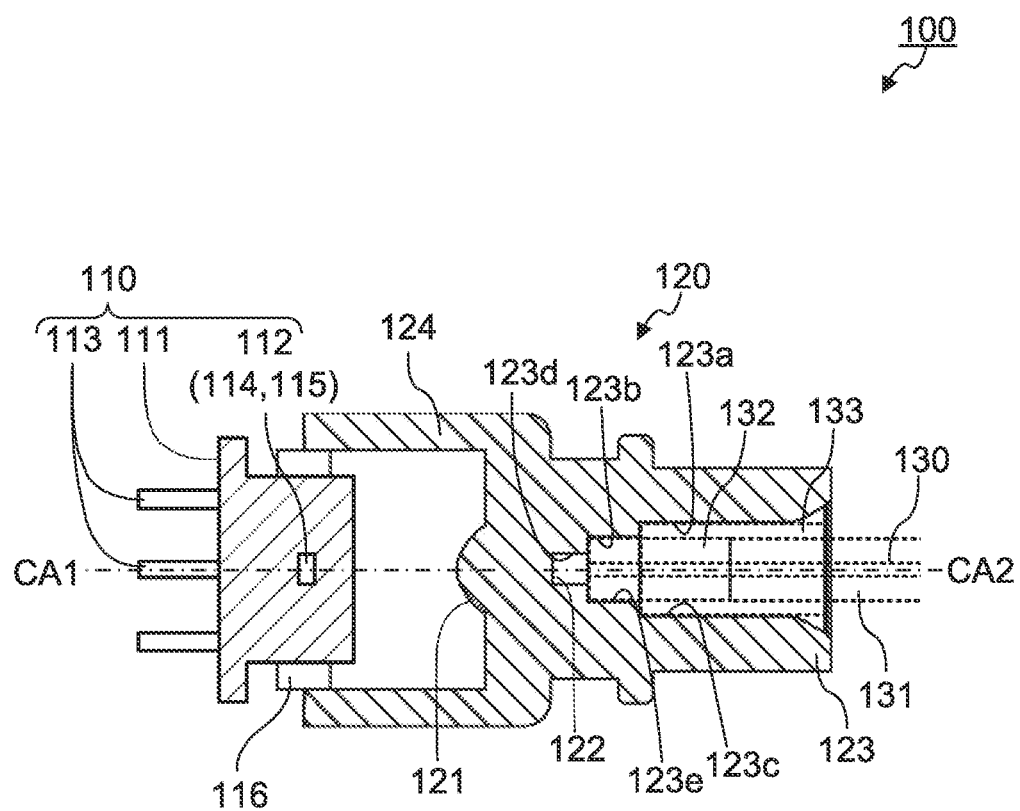
FIG. 1 is a sectional view of an optical module according to an embodiment of the present invention with an optical transmission member fixed.

An optical receptacle and an optical module according to an embodiment of the present invention are elaborated below with reference to the accompanying drawings.
Configuration of Optical Module FIG. 1 is a sectional view of optical module 100 according to the present embodiment with optical transmission member 130 fixed. Note that in FIG. 1, optical transmission member 130, ferrule 131, stub 132 and sleeve 133 are illustrated with dotted lines.

As illustrated in FIG. 1, optical module 100 includes photoelectric conversion element package 110 and optical receptacle 120. Optical module 100 is used with optical transmission member 130 connected to optical receptacle 120. In the present embodiment, stub 132 and sleeve 133 are disposed at optical receptacle 120 in advance, and optical receptacle 120 and optical transmission member 130 are connected to each other by inserting ferrule 131 where optical transmission member 130 is held at sleeve 133. In the present embodiment, optical transmission member 130 held by ferrule 131 is held by first inner surface 123a, and optical transmission member 130 held by stub 132 is held by first inner surface 123a and second inner surface 123b. Optical module 100 may be an optical module for transmission, or an optical module for reception. In the present embodiment, optical module 100 is an optical module for transmission, and optical receptacle 120 guides, to the end surface of optical transmission member 130, light emitted from photoelectric conversion element package 110. Note that in the case where optical module 100 is an optical module for reception, optical receptacle 120 guides, to photoelectric conversion element package 110, light emitted from the end surface of optical transmission member 130.

Photoelectric conversion element package 110 includes housing 111, photoelectric conversion element 112, and lead 113. Photoelectric conversion element 112 is disposed inside housing 111. Photoelectric conversion element package 110 is fixed to optical receptacle 120. In the present embodiment, photoelectric conversion element package 110 is fixed to optical receptacle 120 through cured product 116 of an adhesive agent.

Photoelectric conversion element 112 is light-emitting element 114 or light-receiving element 115, and is disposed inside housing 111. In the case where optical module 100 is an optical module for transmission, photoelectric conversion element 112 is light-emitting element 114. In the case where optical module 100 is an optical module for reception, photoelectric conversion element 112 is light-receiving element 115. In the present embodiment, optical module 100 is an optical module for transmission, and therefore photoelectric conversion element 112 is light-emitting element 114. Light-emitting element 114 is a vertical cavity surface emitting laser (VCSEL), for example. In the case where optical module 100 is an optical module for reception, photoelectric conversion element 112 is light-receiving element 115. Light-receiving element 115 is a photodetector, for example.

One end portion of lead 113 is connected to photoelectric conversion element 112. Lead 113 is disposed in such a manner as to protrude from the bottom surface of housing 111. The number of leads 113 is not limited. In the present embodiment, three leads 113 are provided. In addition, in the present embodiment, three leads 113 are disposed at even intervals in the circumferential direction in bottom view of photoelectric conversion element package 110.

When disposed between photoelectric conversion element package 110 and optical transmission member 130, optical receptacle 120 optically couples the end surface of optical transmission member 130, and photoelectric conversion element package 110 including light-emitting element 114 or light-receiving element 115. In optical module 100 for transmission as in the present embodiment, optical receptacle 120 allows incidence of light emitted from light-emitting element 114 serving as photoelectric conversion element 112, and emits the incident light toward the end surface of optical transmission member 130. Note that in optical module 100 for reception, optical receptacle 120 allows incidence of light emitted from the end surface of optical transmission member 130, and emits it toward the light-receiving surface of light-receiving element 115 serving as photoelectric conversion element 112.

The type of optical transmission member 130 is not limited. Examples of the type of optical transmission member 130 include optical fibers and optical waveguides. In the present embodiment, optical transmission member 130 is an optical fiber. In addition, the optical fiber may be of a single mode type, or a multiple mode type, but the single mode type is preferable.

In the present embodiment, optical transmission member 130 is fixed to optical receptacle 120 through ferrule 131, stub 132 and sleeve 133. Ferrule 131 is a substantially cylindrical member disposed to surround optical transmission member 130. The end of optical transmission member 130 held by ferrule 131 is protruded from ferrule 131. Sleeve 133 is a substantially cylindrical member disposed to cover first inner surface 123a of second cylindrical part 123 of optical receptacle 120. Stub 132 is a substantially cylindrical member disposed to cover second inner surface 123b of second cylindrical part 123 of optical receptacle 120 and a part of the inner surface of sleeve 133. In the present embodiment, stub 132 is a short single-core cylindrical ferrule with a built-in optical fiber polished at both ends that is directly connected to ferrule 131. By inserting ferrule 131 with optical transmission member 130 disposed inside into optical receptacle 120 where sleeve 133 and stub 132 are disposed, optical transmission member 130 is fixed to optical receptacle 120 while being positioned.

Note that optical transmission member 130 may be fixed to optical receptacle 120 without interposing stub 132 and sleeve 133 therebetween. For example, optical transmission member 130 may be fixed to optical receptacle 120 while being positioned by inserting ferrule 131 disposed to surround the end portion of optical transmission member 130 into optical receptacle 120 such that it makes contact with second inner surface 123b of second cylindrical part 123 of optical receptacle 120.
Configuration of Optical Receptacle Optical receptacle 120 is a substantially cylindrical optical member. In the present embodiment, one end of optical receptacle 120 is fixed to optical transmission member 130, and the other end is fixed to photoelectric conversion element package 110. Optical receptacle 120 includes first optical surface 121, second optical surface 122, and second cylindrical part 123. In the present embodiment, optical receptacle 120 further includes first cylindrical part 124 in addition to the above-mentioned configurations.

Optical receptacle 120 is formed of a material that is optically transparent to the light of the wavelength used for optical communications. Examples of the material of optical receptacle 120 include polyetherimide (PEI) such as ULTEM (registered trademark) and a transparent resin such as cyclic olefin resin. In addition, optical receptacle 120 is manufactured by integral molding through injection molding, for example.

First optical surface 121 is an optical surface for allowing, to enter optical receptacle 120, light emitted from photoelectric conversion element package 110 (light-emitting element 114), or emitting, toward photoelectric conversion element package 110 (light-receiving element 115), light entered from second optical surface 122 and travelled inside optical receptacle 120. The shape of first optical surface 121 is not limited. First optical surface 121 may be a convex lens surface protruding toward photoelectric conversion element package 110, a concave lens surface recessed with respect to photoelectric conversion element package 110, or a flat surface. In the present embodiment, first optical surface 121 is a convex lens surface protruding toward photoelectric conversion element package 110. The shape of first optical surface 121 in plan view is not limited. The shape of first optical surface 121 in plan view may be a circular shape or an elliptical shape. In the present embodiment, the shape of first optical surface 121 in plan view is a circular shape.

First central axis CA1 of first optical surface 121 may be or may not be perpendicular to the surface of photoelectric conversion element 112 (the light-emitting surface of light-emitting element 114). In the present embodiment, first central axis CA1 is perpendicular to the surface of photoelectric conversion element 112 (the light-emitting surface of light-emitting element 114). In addition, preferably, first central axis CA1 of first optical surface 121 coincides with the center of the surface of photoelectric conversion element package 110 (the light-emitting surface of light-emitting element 114). First cylindrical part 124 is disposed around first optical surface 121.

First cylindrical part 124 is disposed to surround first central axis CA1 of first optical surface 121, and holds photoelectric conversion element package 110 at a position facing first optical surface 121. The shape of first cylindrical part 124 is not limited as long as photoelectric conversion element package 110 can be held at the inner surface thereof. In the present embodiment, the shape of first cylindrical part 124 is a cylindrical shape. Photoelectric conversion element package 110 is inserted to first cylindrical part 124. When photoelectric conversion element package 110 is inserted to first cylindrical part 124 and fixed thereto through cured product 116 of an adhesive agent, photoelectric conversion element package 110 is fixed to optical receptacle 120.

Second optical surface 122 is an optical surface for emitting, toward the end surface of optical transmission member 130, light entered from first optical surface 121 and travelled inside optical receptacle 120, or allowing, to enter optical receptacle 120, light emitted from the end surface of optical transmission member 130. The shape of second optical surface 122 is not limited. Second optical surface 122 may be a convex lens surface protruding toward optical transmission member 130, a concave lens surface recessed with respect to optical transmission member 130, or a flat surface. In the present embodiment, second optical surface 122 is a flat surface. The shape of second optical surface 122 in plan view is not limited. The shape of second optical surface 122 in plan view may be a circular shape or an elliptical shape. In the present embodiment, the shape of second optical surface 122 in plan view is a circular shape.

Second central axis CA2 of second optical surface 122 may be or may not be perpendicular to the end surface of optical transmission member 130. In the present embodiment, second central axis CA2 is perpendicular to the end surface of optical transmission member 130. Preferably, second central axis CA2 of second optical surface 122 coincides with the center of the end surface of optical transmission member 130. Note that in the present embodiment, first central axis CA1 and second central axis CA2 coincide with each other. Second cylindrical part 123 is disposed around second optical surface 122.

Second cylindrical part 123 is disposed to surround second central axis CA2 of second optical surface 122 at a position further from first optical surface 121 than second optical surface 122, and directly or indirectly holds optical transmission member 130 at a position facing second optical surface 122. The shape of second cylindrical part 123 is a substantially cylindrical shape. Second cylindrical part 123 includes first inner surface 123*a*, and second inner surface 123*b* disposed on second optical surface 122 side than first inner surface 123*a*. In the present embodiment, second cylindrical part 123 further includes first step surface 123*c* that connects first inner surface 123*a* and second inner surface 123*b*, third inner surface 123*d* disposed on second optical surface 122 side than second inner surface 123*b*, and second step surface 123*e* that connects second inner surface 123*b* and third inner surface 123*d*.

First inner surface 123*a* is an inner surface disposed on the opening side of second cylindrical part 123. The shape of first inner surface 123*a* is not limited. In the present embodiment, from the viewpoint of facilitating the insertion of optical transmission member 130, the opening side end portion of first inner surface 123*a* is a tapered surface formed in a shape that comes closer to second central axis CA2 as it goes toward second optical surface 122. On the other hand, from the viewpoint of holding sleeve 133, the other portion of first inner surface 123*a* is a curved surface that is parallel to first central axis CA1. In addition, the cross-sectional shape of first inner surface 123*a* in the direction perpendicular to second central axis CA2 is a circular shape. Unlike second inner surface 123*b*, first inner surface 123*a* need not hold optical transmission member 130, and therefore the diameter of first inner surface 123*a* is greater than the diameter of second inner surface 123*b*. The length of first inner surface 123*a* in the direction along second central axis CA2 is not limited. In the present embodiment, the length of first inner surface 123*a* is appropriately set from the viewpoint of holding sleeve 133. For example, the length of first inner surface 123*a* is 3.5 to 8.0 mm. In the present embodiment, the length of first inner surface 123*a* in the direction along second central axis CA2 is 6 mm.

Second inner surface 123*b* is disposed on second optical surface 122 side than first inner surface 123*a*, and holds optical transmission member 130 at a position facing second optical surface 122. In the present embodiment, second inner surface 123*b* indirectly holds optical transmission member 130 through stub 132. In the present embodiment, second inner surface 123*b* is connected to first inner surface 123*a* through first step surface 123*c*, and connected to third inner surface 123*d* through second step surface 123*e*. The shape of second inner surface 123*b* is not limited as long as optical transmission member 130 can be directly held or indirectly held (e.g., through stub 132 or ferrule 131). In the present embodiment, the cross-sectional shape of second inner surface 123*b* in the direction perpendicular to second central axis CA2 is a circular shape corresponding to the external shape of stub 132. The diameter of second inner surface 123b is appropriately set in accordance with the object to be held (e.g., optical transmission member 130, stub 132 or ferrule 131). The diameter of second inner surface 123b is smaller than the diameter of first inner surface 123a, and greater than the diameter of third inner surface 123d. From the viewpoint of appropriately holding optical transmission member 130 and shortening the length of the high accuracy processing part at pin-shaped first metal mold 310 described later, the length of second inner surface 123b in the direction along second central axis CA2 is 0.5 to 4.0 mm. In addition, the effects are likely to be obtained when approximately 40% of the stub total length is in contact with second inner surface, and it is therefore preferable that the length of second inner surface 123b in the direction along second central axis CA2 be 1.0 to 2.5 mm. In the present embodiment, the length of second inner surface 123b in the direction along first central axis CA1 is 0.5 mm.

First step surface 123c connects first inner surface 123a and second inner surface 123b. The configuration of first step surface 123c is not limited. In the present embodiment, first step surface 123c is a flat surface. In the present embodiment, the end of sleeve 133 makes contact with first step surface 123c.

Third inner surface 123d is disposed on second optical surface 122 side than second inner surface. In the present embodiment, third inner surface 123d is connected to second inner surface 123b through second step surface 123e. The shape of third inner surface 123d is not limited as long as the optical path between second optical surface 122 and the end surface of optical transmission member 130 is not affected. In the present embodiment, the cross-sectional shape of third inner surface 123d in the direction perpendicular to second central axis CA2 is a circular shape. The diameter of third inner surface 123d is smaller than the diameter of second inner surface 123b.

Second step surface 123e connects second inner surface 123b and third inner surface 123d. The configuration of second step surface 123e is not limited. In the present embodiment, second step surface 123e is a flat surface. In the present embodiment, the end of stub 132 makes contact with second step surface 123e.

Figure 2A:
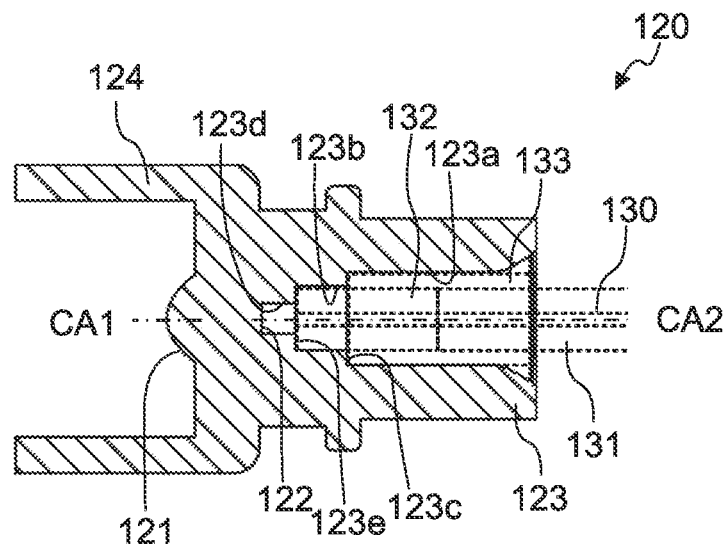
FIGS. 2A and 2B are sectional views for describing a feature of an optical receptacle according to the embodiment of the present invention.
Figure 2B:
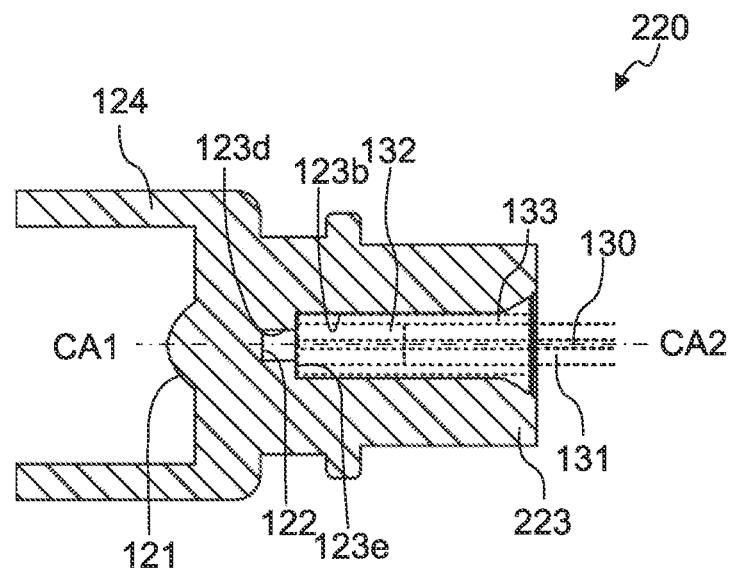

A feature of optical receptacle 120 according to the present embodiment is described here. FIG. 2A is a sectional view of optical receptacle 120 according to the present embodiment. FIG. 2B is a sectional view of optical receptacle 220 of a comparative example. In optical receptacle 120 of the comparative example, second cylindrical part 223 does not include first inner surface 123a, and accordingly the length of second inner surface 123b in the direction along second central axis CA2 is longer by that length. That is, in optical receptacle 120 of the comparative example, the length of second inner surface 123b for positioning optical transmission member 130 (stub 132) is significantly greater than in optical receptacle 120 according to the present embodiment.

As illustrated in FIG. 2A, in optical receptacle 120 according to the present embodiment, sleeve 133 is disposed to cover first inner surface 123a and stub 132 is disposed to cover second inner surface 123b and a part of the inner surface of sleeve 133. Next, optical transmission member 130 fixed to ferrule 131 is inserted. In this manner, in optical receptacle 120 according to the present embodiment, the positional accuracy of optical transmission member 130 with respect to second optical surface 122 is set by second inner surface 123b. Therefore, the molding accuracy of second inner surface 123b is important in order to ensure the positional accuracy of optical transmission member 130 with respect to second optical surface 122.

On the other hand, as illustrated in FIG. 2B, in optical receptacle 220 according to the comparative example, sleeve 133 is disposed to cover first inner surface 123a, and stub 132 is disposed to cover a part of second optical surface 122 side in the inner surface of sleeve 133. Next, optical transmission member 130 fixed to ferrule 131 is inserted. In this manner, also in optical receptacle 220 according to the comparative example, the positional accuracy of optical transmission member 130 with respect to second optical surface 122 is set by second inner surface 123b. Therefore, the molding accuracy of second inner surface 123b is important in order to ensure the positional accuracy of optical transmission member 130 with respect to second optical surface 122.

Optical receptacle 120 according to the present embodiment and optical receptacle 220 according to the comparative example differ from each other in length of second inner surface 123b in the direction along second central axis CA2. More specifically, in optical receptacle 120 according to the present embodiment, the length is 1 mm, whereas in optical receptacle 220 according to the comparative example, the length is 4 mm.

In this manner, in optical receptacle 120 according to the present embodiment, first inner surface 123a is provided, and as such the length of second inner surface 123b in the direction along second central axis CA2 is shorter than in optical receptacle 220 according to the comparative example. In this manner, when optical receptacle 120 is manufactured by injection molding, a portion where high accuracy is required (the portion related to the positional accuracy of optical transmission member 130 with respect to second optical surface 122) is small, and the thin portion is downsized whereas the thick portion is enlarged in pin-shaped first metal mold 310 (described later) for molding the inner surface of second cylindrical part 123. In this manner, in the case where it is necessary to modify the portion in first metal mold 310 where high accuracy is required, the modifications can be easily made. In addition, in the injection molding, the position of first metal mold 310 is less displaced, and less distortion occurs in second inner surface 123b.

On the other hand, in optical receptacle 220 according to the comparative example, the portion where high accuracy is required in first metal mold 310 is large. Thus, it is difficult to modify the portion in first metal mold 310 where high accuracy is required when necessary. In addition, in the injection molding, the position of first metal mold 310 is easily displaced, and distortion easily occurs in second inner surface 123b.

Manufacturing Method for Optical Receptacle

Figure 3A:
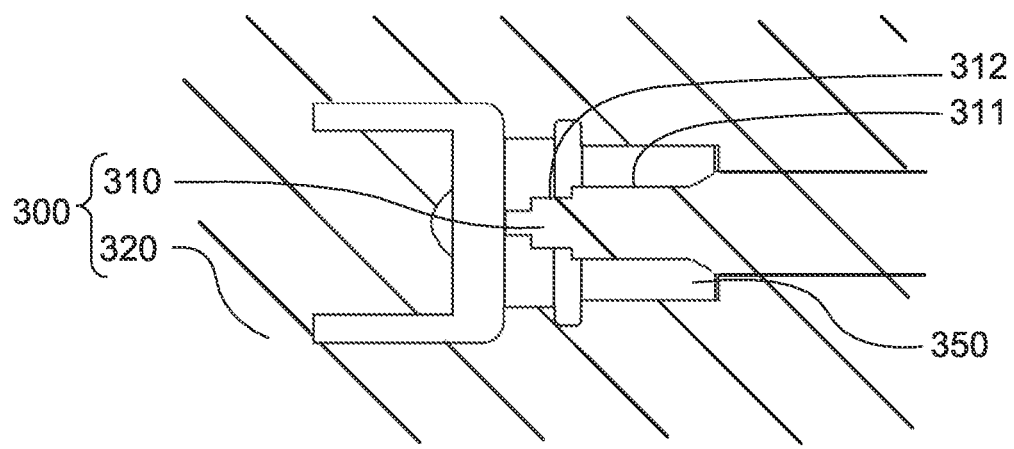
FIGS. 3A to 3C are sectional views for describing a manufacturing method for the optical receptacle according to the embodiment of the present invention.
Figure 3B:
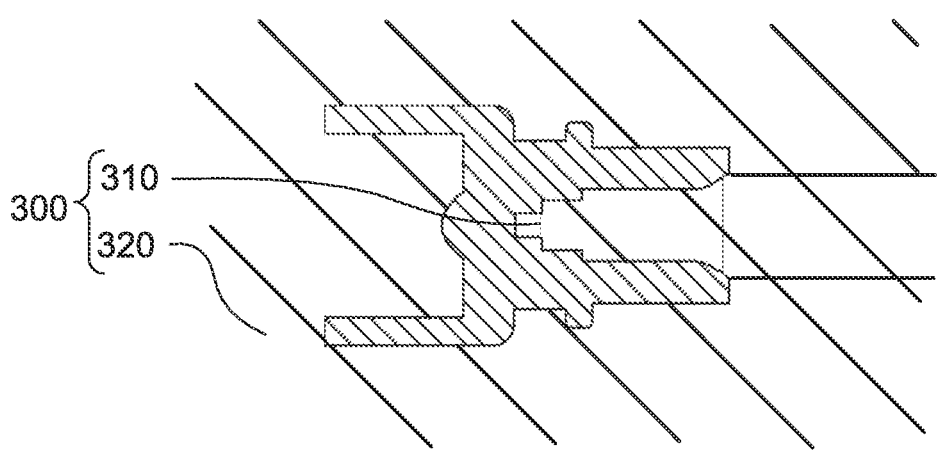
Figure 3C:
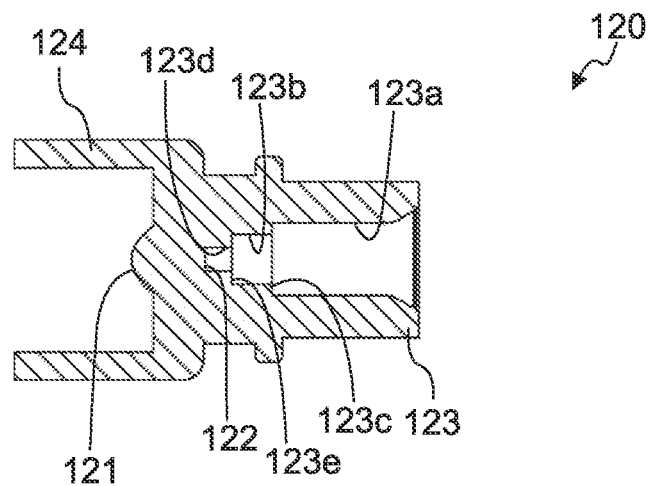

Next, a manufacturing method for optical receptacle 120 is described. FIGS. 3A to 3C are diagrams for describing a manufacturing method for optical receptacle 120. The following describes a manufacturing method for optical receptacle 120, which is an injection-molded article obtained through injection molding. In the manufacturing method for the optical receptacle according to the present embodiment, the inner surface of second cylindrical part 123 is formed by using first metal mold 310 including first molding surface 311 with a shape complementary to first inner surface 123a and second molding surface 312 with a shape complementary to second inner surface 123b.

Optical receptacle 120 as an injection-molded article is manufactured by using metal mold 300. The configuration of metal mold 300 is not limited as long as first metal mold 310 is provided. In the present embodiment, metal mold 300 includes first metal mold 310 and second metal mold 320. First metal mold 310 is a metal mold piece for molding first inner surface 123a and second inner surface 123b. In the present embodiment, first metal mold 310 molds first step surface 123c, third inner surface 123d and second step surface 123e, in addition to first inner surface 123a and second inner surface 123b. First metal mold 310 includes first molding surface 311 and second molding surface 312. First molding surface 311 has a shape complementary to first inner surface 123a. That is, in the present embodiment, first molding surface 311 has a circular cross-sectional shape. Second molding surface 312 has a shape complementary to second inner surface 123b. That is, in the present embodiment, second molding surface 312 has a circular cross-sectional shape. The configuration of second metal mold 320 is not limited. Second metal mold 320 forms the outer surface of optical receptacle 120 except for the inner surface of second cylindrical part 123. The number of pieces of second metal mold 320 is also not limited.

The manufacturing method for optical receptacle 120 includes a mold clamping step, a filling process, a pressure holding step, and a mold opening step.

As illustrated in FIG. 3A, in the clamping step, cavity 350 is formed by clamping first metal mold 310 and second metal mold 320. Cavity 350 has a shape complementary to optical receptacle 120. As illustrated in FIG. 3B, in the filling process, molten resin is supplied into cavity 350 from a gate not illustrated in the drawings. As illustrated in FIG. 3B, in the pressure holding step, the molten resin in cavity 350 is cooled naturally while maintaining pressure. As illustrated in FIG. 3C, in the mold opening step, metal mold 300 is opened and an optical receptacle as an injection-molded article is removed. Through the above-described steps, optical receptacle 120 as an injection-molded article is obtained.

Effect

As described above, in optical receptacle 120 according to the present embodiment, second inner surface 123b related to the positional accuracy of optical transmission member 130 with respect to second optical surface 122 is small, and thus it is easy to perform the modification of the metal mold for improving the positional accuracy of optical transmission member 130 with respect to second optical surface 122. In addition, in the injection molding, first metal mold 310 is less easily displaced, and distortion less occurs in second inner surface 123b, and thus, optical receptacle 120 according to the present embodiment can perform optical communications with high light coupling efficiency while achieving the excellent positional accuracy of optical transmission member 130 with respect to second optical surface 122.

INDUSTRIAL APPLICABILITY

The optical receptacle and the optical module according to the embodiment of the present invention are suitable for optical communications using an optical transmission member.

REFERENCE SIGNS LIST

100 Optical module
110 Photoelectric conversion element package
111 Housing
112 Photoelectric conversion element
113 Lead
114 Light-emitting element
115 Light-receiving element
116 Adhesive agent cured product
120, 220 Optical receptacle
121 First optical surface
122 Second optical surface
123 Second cylindrical part
123a First inner surface
123b Second inner surface
123c First step surface
123d Third inner surface
123e Second step surface
124 First cylindrical part
130 Optical transmission member
131 Ferrule
132 Stub
133 Sleeve
300 Metal mold
310 First metal mold
311 First molding surface
312 Second molding surface
320 Second metal mold
350 Cavity
CA1 First central axis
CA2 Second central axis

What is claimed is:

1. An optical receptacle that is integrally molded and configured to optically couple a photoelectric conversion element and an optical transmission member when the optical receptacle is disposed between a photoelectric conversion element package including the photoelectric conversion element and the optical transmission member, the optical receptacle comprising:
    a first optical surface configured to allow, to enter the optical receptacle, light emitted from the photoelectric conversion element package, or configured to emit, toward the photoelectric conversion element package, light travelled inside the optical receptacle;
    a second optical surface configured to emit, toward the optical transmission member, the light travelled inside the optical receptacle, or configured to allow, to enter the optical receptacle, light emitted from the optical transmission member; and
    a second cylindrical part disposed to surround a second central axis of the second optical surface at a position further from the first optical surface than the second optical surface,
    wherein the second cylindrical part includes:
        a first inner surface with a circular shape in a cross section perpendicular to the second central axis,
        a second inner surface disposed closer to the second optical surface than the first inner surface and configured to hold the optical transmission member at a position facing the second optical surface, the second inner surface having a circular shape in the cross section perpendicular to the second central axis, and
        a third inner surface disposed closer to the second optical surface than the second inner surface,
    wherein a diameter of the first inner surface is greater than a diameter of the second inner surface, and
    wherein a length of the second inner surface in a direction along the second central axis is 0.5 to 4.0 mm.

2. The optical receptacle according to claim 1, further comprising a first cylindrical part disposed to surround a first central axis of the first optical surface and configured to hold the photoelectric conversion element package at a position facing the first optical surface.

3. An optical module, comprising:
a photoelectric conversion element package including a photoelectric conversion element; and
the optical receptacle according to claim 1 configured to optically couple the photoelectric conversion element and an optical transmission member.

4. A manufacturing method for the optical receptacle according to claim 1, the manufacturing method comprising:
forming an inner surface of the second cylindrical part by using a metal mold including a first molding surface with a shape complementary to the first inner surface, a second molding surface with a shape complementary to the second inner surface, and a third molding surface with a shape complementary to a third inner surface.

5. An optical module, comprising:
a photoelectric conversion element package including a photoelectric conversion element; and
the optical receptacle according to claim 2 configured to optically couple the photoelectric conversion element and an optical transmission member.

6. A manufacturing method for the optical receptacle according to claim 2, the manufacturing method comprising:
forming an inner surface of the second cylindrical part by using a metal mold including a first molding surface with a shape complementary to the first inner surface, a second molding surface with a shape complementary to the second inner surface, and a third molding surface with a shape complementary to the third inner surface.

* * * * *